United States Patent
Yang et al.

(10) Patent No.: US 12,056,915 B2
(45) Date of Patent: Aug. 6, 2024

(54) METHOD FOR GENERATING DEFECTIVE IMAGE, ELECTRONIC DEVICE USING THE SAME

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 430 days.

(21) Appl. No.: 17/588,190

(22) Filed: Jan. 28, 2022

(65) Prior Publication Data

US 2022/0254145 A1    Aug. 11, 2022

(30) Foreign Application Priority Data

Feb. 9, 2021    (CN) .......................... 202110183339.X

(51) Int. Cl.
| | |
|---|---|
| G06T 7/00 | (2017.01) |
| G06V 10/774 | (2022.01) |
| G06V 10/776 | (2022.01) |
| G06V 10/82 | (2022.01) |

(52) U.S. Cl.
CPC ............ *G06V 10/774* (2022.01); *G06T 7/001* (2013.01); *G06V 10/776* (2022.01); *G06V 10/82* (2022.01); *G06T 2207/20081* (2013.01); *G06T 2207/20084* (2013.01)

(58) Field of Classification Search
CPC .... G06K 9/46; G06K 9/00362; G06F 30/398; G06N 20/00; G06N 3/08; G06N 3/0454; G06V 10/774; G06V 10/82; G06V 10/776; G06T 7/001
See application file for complete search history.

(56) References Cited

U.S. PATENT DOCUMENTS

| | | | |
|---|---|---|---|
| 2018/0024968 A1 | 1/2018 | Clinchant et al. | |
| 2021/0012054 A1* | 1/2021 | Adler | G01N 23/18 |
| 2021/0073528 A1* | 3/2021 | Lagerman | G06V 40/10 |

FOREIGN PATENT DOCUMENTS

WO    2020236624    11/2020

* cited by examiner

*Primary Examiner* — Phuoc H Doan
(74) *Attorney, Agent, or Firm* — ScienBiziP, P.C.

(57) ABSTRACT

A method for generating defective image of products applied in an electronic device includes generating first input data according to flawless sample images and a first noise vector, using an autoencoder as a generator of a Generative Adversarial Network (GAN), inputting the first input data to the generator, and generating images for training in defects. The method further includes calculating a first loss value between the flawless sample images and the defect training images, inputting the defect training images into a discriminator of the GAN, and calculating a second loss value. The method further includes obtaining an optimized GAN and taking the optimized GAN as a defective image adversarial network, obtaining flawless testing images, inputting the flawless testing images and a second noise into a generator of the defective image adversarial network, and generating images of defects by processing the flawless testing images and the second noise.

20 Claims, 3 Drawing Sheets

METHOD FOR GENERATING DEFECTIVE IMAGE, ELECTRONIC DEVICE USING THE SAME

CROSS-REFERENCE TO RELATED APPLICATIONS

This application claims priority to Chinese Patent Application No. 202110183339.X filed on Feb. 9, 2021, the contents of which are incorporated by reference herein.

FIELD

The subject matter herein generally relates to a field of image processing, in particular, to a method for generating defective images of products and an electronic device.

BACKGROUND

When detecting surface defects of products, it is difficult to establish comprehensive defect sample data, as surface defect samples are not easy to collect. In the related art, when using sample images to train classification network for defect detection, the accuracy of defect detection results is not high due to lack of various types of defect samples.

BRIEF DESCRIPTION OF THE DRAWINGS

Implementations of the present disclosure will now be described, by way of embodiment, with reference to the attached figures.

DETAILED DESCRIPTION

Figure 1:
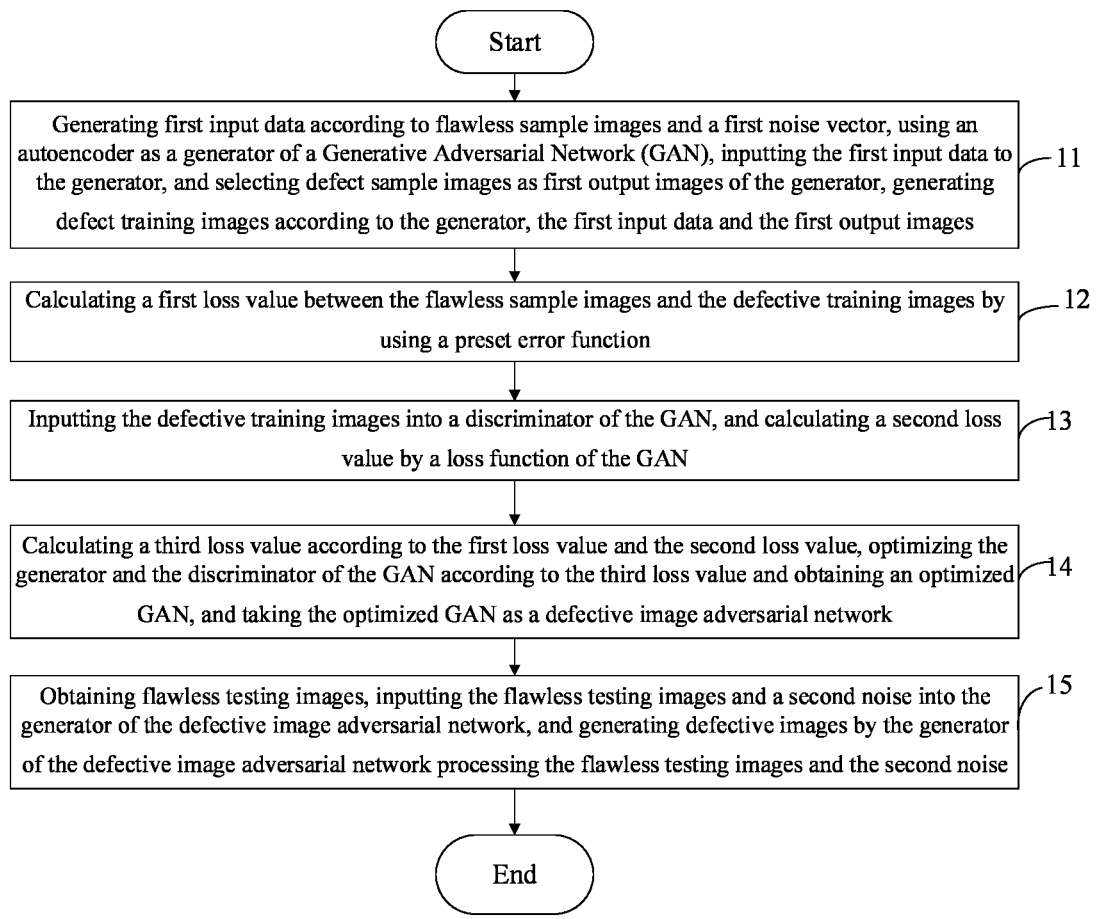
FIG. 1 is a flowchart of one embodiment of a method for generating defective image according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

A method for generating defective images is illustrated in the present disclosure. The method is applied in one or more electronic devices. The electronic device can function according to a number of preset or stored instructions. The hardware of the electronic device includes, but is not limited to, a microprocessor, an Application Specific Integrated Circuit (ASIC), a Field Programmable Gate Array (FPGA), a Digital signal processor (DSP), an embedded equipment, etc.

In one embodiment, the electronic device can be a desktop computer, a notebook computer, a tablet computer, a cloud server, or other computing device. The electronic device can carry out a human-computer interaction with user by a keyboard, a mouse, a remote controller, a touch pad, or a voice control device.

FIG. 1 illustrates the method for generating defective image. The method is applied in an electronic device 6 (referring to FIG. 3). The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, generating first input data according to flawless sample images and a first noise vector, using an autoencoder as a generator of a Generative Adversarial Network (GAN), inputting the first input data to the generator, and selecting defective sample images as first output images of the generator, generating defect training images according to the generator, the first input data, and the first output images.

In one embodiment, the method further includes: obtaining a flawless sample training data set and a defective sample training data set, the flawless sample training data set includes a number of the flawless sample images of surface defects of products, and the defective sample training data set includes a number of the defective sample images. In one embodiment, the products can be electronic products, such as phones, iPads, or notebooks.

In one embodiment, generating first input data according to flawless sample images and a first noise vector includes: vectorizing the flawless sample images and obtaining a feature vector of the flawless sample images; generating the first noise vector conforming to a Gaussian random distribution by implementing a preset noise generation method; splicing the feature vector of the flawless sample images and the first noise vector to obtain the first input data.

For example, when the feature vector of the flawless sample images is [x1, x2, x3, . . . , xn], and the first noise vector is [y1, y2, y3, . . . , ym], the feature vector of the flawless sample images and the first noise vector are spliced to obtain the first input data [x1, x2, x3, . . . , xn, y1, y2, y3, . . . , ym].

In one embodiment, using an autoencoder as the generator of the GAN, inputting the first input data to the generator, and selecting the defective sample images as the first output images of the generator, generating the defect training images according to the generator, the first input data, and the first output images includes: inputting the first input data into the generator; calculating the first input data by using coding layers of the generator and obtaining an implicit vector of the first input data; selecting the defective sample images as the first output images; reconstructing the first output images according to the implicit vector of the first input data by using decoding layers of the generator and obtaining the defect training images.

At block 12, calculating a first loss value between the flawless sample images and the defective training images by using a preset error function.

In one embodiment, calculating the first loss value between the flawless sample images and the defective training images by using the preset error function includes: obtaining a first pixel matrix of the flawless sample images; obtaining a second pixel matrix of the defective training images; calculating a mean square deviation of the first pixel matrix and the second pixel matrix, and taking the mean square deviation as the first loss value.

In one embodiment, the mean square deviation is calculated according to a formula $$MSE = \frac{1}{n}\sum_{i=1}^{n}(y_i - \hat{y}_i)^2, \quad \text{(formula (1))}$$

where MSE is the mean square deviation, n is a number of pixels of the first pixel matrix and the second pixel matrix, $y_i$ is the ith vector of the first pixel matrix, and $\hat{y}_i$ is the ith vector of the second pixel matrix.

At block 13, inputting the defective training images into a discriminator of the GAN, and calculating a second loss value by a loss function of the GAN.

In one embodiment, the discriminator is used to determine whether the defective training image belongs to the defective sample training data set.

In one embodiment, a formula of the loss function of the GAN is $E_{t \sim P_{data}(t)}[\log D(t)]E_{z \sim p_z(z)}[\log (1-D(G(z|d)))]$ (formula (2)), where G is the generator, D is the discriminator, t is the defective sample training data set, t P data(t) is a distribution of the defective sample training data set t, D(t) represents a first discrimination result that the discriminator D determines whether samples in the defective sample training data set t are true or false, E represents an output expectation, condition variable d is the first output images, $z \sim p_z(z)$ represents a priori Gaussian distribution of random Gaussian noise Z, and D(G(z|d)) represents a second discrimination result of the discriminator D determining whether an output of the generator G under the condition variable d belongs to the defect sample training data set t.

At block 14, calculating a third loss value according to the first loss value and the second loss value, optimizing the generator and the discriminator of the GAN according to the third loss value and obtaining an optimized GAN, and taking the optimized GAN as a defective image adversarial network.

In one embodiment, calculating the third loss value according to the first loss value and the second loss value includes: weighting and summing the first loss value and the second loss value according to a formula Loss=αLoss1+ βLoss2 (formula (3)) and obtaining the third loss value, where Loss is the third loss value, α is a weight of the first loss value, Loss1 is the first loss value, β is a weight of the second loss value, and Loss2 is the second loss value.

In one embodiment, optimizing the generator and the discriminator of the GAN according to the third loss value and obtaining the optimized GAN, and taking the optimized GAN as the defective image adversarial network includes: adjusting parameters of the generator and the discriminator with the third loss value taken as the loss function; when a discriminating accuracy output of determinations by the discriminator reaches a preset condition, stopping then the optimizing of the generator and the discriminator.

At block 15, obtaining flawless testing images, inputting the flawless testing images and a second noise into a generator of the defective image adversarial network, and generating defective images after processing the flawless testing images and the second noise by the generator of the defective image adversarial network.

In one embodiment, obtaining the flawless testing images, inputting the flawless testing images and the second noise into the generator of the defective image adversarial network, and generating the defective images by the generator of the defective image adversarial network processing the flawless testing images and the second noise includes: vectorizing the flawless testing images and obtaining a feature vector of the flawless testing images; generating a vector of the second noise conforming to the Gaussian random distribution by implementing a preset noise generation method; splicing the feature vector of the flawless testing images and the vector of the second noise and obtaining second input data; inputting the second input data into the generator of the defective image adversarial network; calculating the second input data by using coding layers of the generator of the defective image adversarial network, and obtaining an implicit vector of the second input data; processing the implicit vector of the second input data by the generator of the defective image adversarial network and thereby obtaining the defective images.

The present application can generate defective images similar to the defective sample images, and various and comprehensive defective images can be generated, so as to realize a subsequent training and optimization of an image defect detection model based on deep learning or neural network, finally improving the accuracy of defect detection of images.

Figure 2:
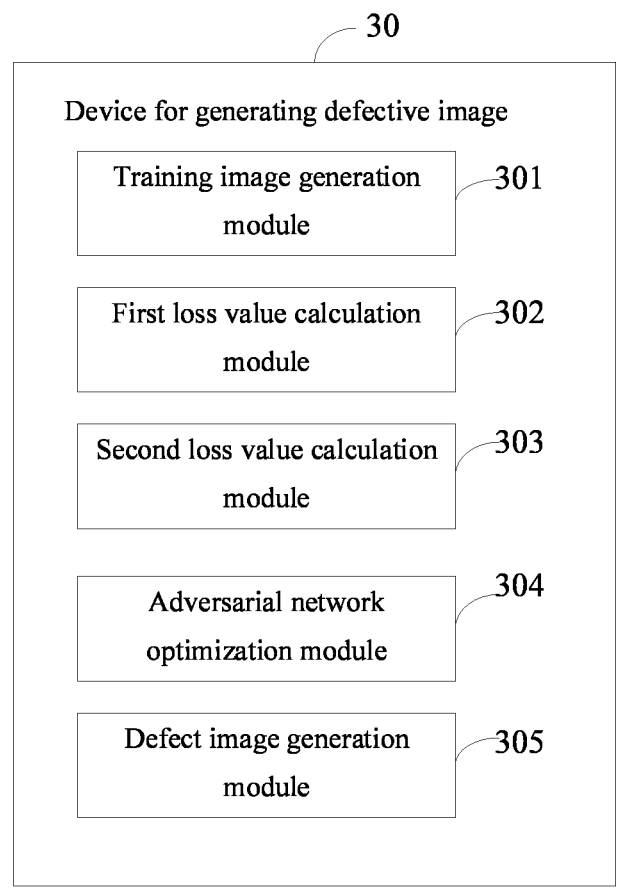
FIG. 2 is a block diagram of one embodiment of a device for generating defective image according to the present disclosure.

FIG. 2 illustrates a device 30 for generating defective image. The device 30 is applied in the electronic device 6. In one embodiment, according to the functions it performs, the device 30 can be divided into a plurality of functional modules. The functional modules perform blocks 11-15 in the embodiment of FIG. 1 to perform the functions of generating defective image.

In one embodiment, the device 30 includes, but is not limited to, a training image generation module 301, a first loss value calculation module 302, a second loss value calculation module 303, an adversarial network optimization module 304, and a defect image generation module 305. The modules 301-305 of the device 30 can be collections of software instructions. In one embodiment, the program code of each program segment in the software instructions can be stored in a storage device and executed by at least one processor to perform the required functions.

The training image generation module 301 generates first input data according to flawless sample images and a first noise vector, uses an autoencoder as a generator of a Generative Adversarial Network (GAN), inputs the first input data to the generator, and selects defective sample images as first output images of the generator, and generates defect training images according to the generator, the first input data, and the first output images.

In one embodiment, the training image generation module 301 obtains a flawless sample training data set and a defective sample training data set, and the flawless sample training data set includes a number of the flawless sample images, and the defective sample training data set includes a number of the defective sample images.

In one embodiment, the training image generation module 301 vectorizes the flawless sample images and obtains a feature vector of the flawless sample images; generates the first noise vector conforming to a Gaussian random distribution by implementing a preset noise generation method; splices the feature vector of the flawless sample images and the first noise vector to obtain the first input data.

For example, when the feature vector of the flawless sample images is [x1, x2, x3, . . . , xn], and the first noise vector is [y1, y2, y3, . . . , ym], the feature vector of the flawless sample images and the first noise vector are spliced to obtain the first input data [x1, x2, x3, . . . , xn, y1, y2, y3, . . . , ym].

In one embodiment, the training image generation module 301 inputs the first input data into the generator; calculates the first input data by using coding layers of the generator and obtains an implicit vector of the first input data; selects the defective sample images as the first output images; reconstructs the first output images according to the implicit vector of the first input data by using decoding layers of the generator and obtaining the defect training images.

The first loss value calculation module 302 calculates a first loss value between the flawless sample images and the defective training images by using a preset error function.

In one embodiment, the first loss value calculation module 302 obtains a first pixel matrix of the flawless sample images; obtains a second pixel matrix of the defective training images; calculates a mean square deviation of the first pixel matrix and the second pixel matrix, and takes the mean square deviation as the first loss value.

In one embodiment, the mean square deviation is calculated according to the above formula (1), where MSE is the mean square deviation, n is a number of pixels of the first pixel matrix and the second pixel matrix, $y_i$ is the ith vector of the first pixel matrix, and $\hat{y}_i$ is the ith vector of the second pixel matrix.

The second loss value calculation module 303 inputs the defective training images into a discriminator of the GAN, and calculates a second loss value by a loss function of the GAN.

In one embodiment, the discriminator is used to determine whether the defective training image belongs to the defective sample training data set.

In one embodiment, a formula of the loss function of the GAN is as formula (2) above, where G is the generator, $t \sim P_{data}(t)$ is the distribution of the defective sample training data set t, D(t) represents that a first discrimination result that discriminator D discriminates whether the samples in the defective sample training data set t are true or false, E represents an output expectation, and condition variable d are the first output images, $z \sim p_z(z)$ represents a priori Gaussian distribution of random Gaussian noise Z, and D(G(z|d)) represents a second discrimination result that the discriminator D discriminates whether the output of generator G under the condition variable d belongs to the defect sample training data set.

The adversarial network optimization module 304 calculates a third loss value according to the first loss value and the second loss value, optimizes the generator and the discriminator of the GAN according to the third loss value and obtains an optimized GAN, and takes the optimized GAN as a defective image adversarial network.

In one embodiment, the adversarial network optimization module 304 applies weightings and sums the first loss value and the second loss value according to above formula (3), and obtains the third loss value, where Loss is the third loss value, α is a weight of the first loss value, Loss1 is the first loss value, β is a weight of the second loss value, and Loss2 is the second loss value.

In one embodiment, the adversarial network optimization module 304 adjusts parameters of the generator and the discriminator with the third loss value taken as the loss function; stops the optimization of the generator and the discriminator when a discriminating accuracy output by the determinations of the discriminator reaches a preset condition.

The defect image generation module 305 obtains flawless testing images, inputs the flawless testing images and a second noise into a generator of the defective image adversarial network, and generates defective images by the generator of the defective image adversarial network processing the flawless testing images and the second noise.

In one embodiment, the defect image generation module 305 vectorizes the flawless testing images and obtains a feature vector of the flawless testing images; generates a vector of the second noise conforming to the Gaussian random distribution by implementing a preset noise generation method; splices the feature vector of the flawless testing images and the vector of the second noise and obtains second input data; inputs the second input data into the generator of the defective image adversarial network; calculates the second input data by using coding layers of the generator of the defective image adversarial network, and obtains an implicit vector of the second input data; processes the implicit vector of the second input data to obtain the defective images by the generator of the defective image adversarial network.

Figure 3:
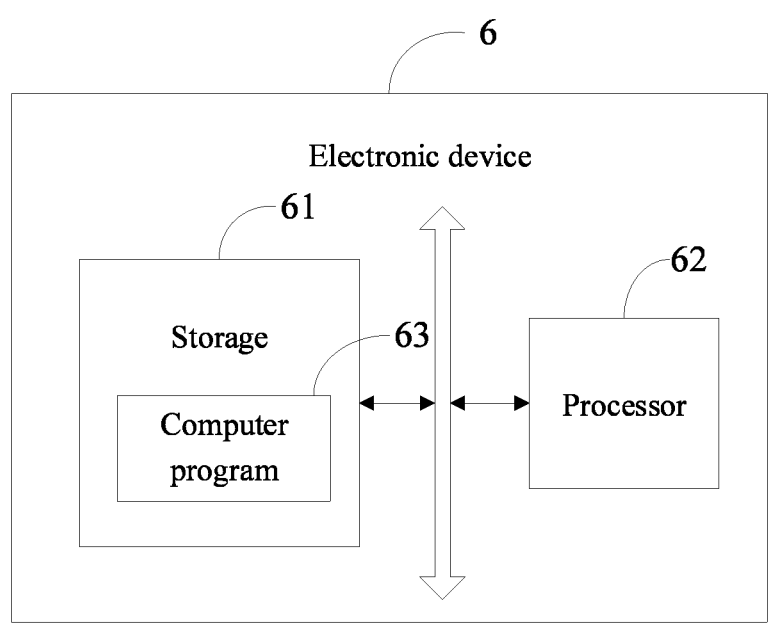
FIG. 3 is a schematic diagram of one embodiment of an electronic device employing the method of FIG. 1.

FIG. 3 illustrates the electronic device 6. The electronic device 6 includes a storage 61, a processor 62, and a computer program 63 stored in the storage 61 and executed by the processor 62. When the processor 62 executes the computer program 63, blocks in the embodiment of the method for generating defective image are implemented, for example, blocks 11-15 as shown in FIG. 1. Alternatively, when the processor 62 executes the computer program 63, the functions of the modules in the embodiment of the device 30 for generating defective image are implemented, for example, modules 301-305 shown in FIG. 2.

In one embodiment, the computer program 63 can be partitioned into one or more modules/units that are stored in the storage 61 and executed by the processor 62. The one or more modules/units may be a series of computer program instruction segments capable of performing a particular function, and the instruction segments describe the execution of the computer program 63 in the electronic device 6. For example, the computer program 63 can be divided into the training image generation module 301, the first loss value calculation module 302, the second loss value calculation module 303, the adversarial network optimization module 304, and the defect image generation module 305, as shown in FIG. 2.

In one embodiment, the electronic device 6 can be a computing device such as a desktop computer, a notebook, a handheld computer, and a cloud terminal device. FIG. 3 shows only one example of the electronic device 6. There are no limitations of the electronic device 6, and other examples may include more or less components than those illustrated, or some components may be combined, or have a different arrangement. The components of the electronic device 6 may also include input devices, output devices, communication units, network access devices, buses, and the like.

The processor 62 can be a central processing unit (CPU), or other general-purpose processor, a digital signal processor (DSP), an application specific integrated circuit (ASIC), Field-Programmable Gate Array (FPGA) or other programmable logic device, discrete gate or transistor logic device, discrete hardware components, etc. The processor 62 may be a microprocessor or the processor may be any conventional processor. The processor 62 is the control center of the electronic device 6, and connects the electronic device 6 by using various interfaces and lines. The storage 61 can be used to store the computer program 63, modules or units, and the processor 62 can perform various functions of the electronic device 6 by running or executing the computer program, modules, or units stored in the storage 61 and by calling up the data stored in the storage 61.

In one embodiment, the storage 61 may mainly include a program storage area and a data storage area, wherein the program storage area may store an operating system, an application program (such as a sound playback function, an image playing function, etc.) required for at least one function, etc. The data storage area can store data (such as audio data, telephone book, etc.) created according to the use of electronic device 6. In addition, the storage 61 may include a high-speed random access memory, and may include a non-volatile memory, such as a hard disk, an internal memory, a plug-in hard disk, a smart media card (SMC), a secure digital (SD) card, a flash card, at least one disk storage device, a flash memory device, or other solid state storage device.

In one embodiment, the modules/units integrated in the electronic device 6 can be stored in a computer readable storage medium if such modules/units are implemented in the form of a product. Thus, the present disclosure may be implemented and realized in any part of the method of the foregoing embodiments, or may be implemented by the computer program, which may be stored in the computer readable storage medium. The steps of the various method embodiments described above may be implemented by a computer program when executed by a processor. The computer program includes computer program code, which may be in the form of source code, object code form, executable file, or some intermediate form. The computer readable medium may include any entity or device capable of carrying the computer program code, a recording medium, a USB flash drive, a removable hard disk, a magnetic disk, an optical disk, a computer memory, a read-only memory (ROM), random access memory (RAM), electrical carrier signals, telecommunication signals, and software distribution media.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method for generating defective images comprising:
generating first input data according to flawless sample images and a first noise vector, and using an autoencoder as a generator of a Generative Adversarial Network (GAN);
inputting the first input data to the generator, selecting defective sample images as first output images of the generator, and generating defect training images according to the generator, the first input data, and the first output images;
calculating a first loss value between the flawless sample images and the defective training images by using a preset error function;
inputting the defective training images into a discriminator of the GAN, and calculating a second loss value by a loss function of the GAN;
calculating a third loss value according to the first loss value and the second loss value, optimizing the generator and the discriminator of the GAN according to the third loss value and obtaining an optimized GAN, and taking the optimized GAN as a defective image adversarial network; and
obtaining flawless testing images, inputting the flawless testing images and a second noise into a generator of the defective image adversarial network, and generating the defective images by processing the flawless testing images and the second noise using the generator of the defective image adversarial network.

2. The method for generating defective image as recited in claim 1, wherein generating the first input data according to the flawless sample images and the first noise vector comprises:
vectorizing the flawless sample images and obtaining a feature vector of the flawless sample images;
generating the first noise vector conforming to a Gaussian random distribution by implementing a preset noise generation method; and
splicing the feature vector of the flawless sample images and the first noise vector, and obtaining the first input data.

3. The method for generating defective image as recited in claim 2, wherein inputting the first input data to the generator, selecting the defective sample images as the first output images of the generator, and generating the defect training images according to the generator, the first input data, and the first output images comprise:
inputting the first input data into the generator;
calculating the first input data by using coding layers of the generator and obtaining an implicit vector of the first input data;
selecting the defective sample images as the first output images; and
reconstructing the first output images according to the implicit vector of the first input data by using decoding layers of the generator and obtaining the defect training images.

4. The method for generating defective image as recited in claim 1, wherein calculating the first loss value between the flawless sample images and the defective training images by using the preset error function comprises:

obtaining a first pixel matrix of the flawless sample images;

obtaining a second pixel matrix of the defective training images; and calculating a mean square deviation of the first pixel matrix and the second pixel matrix, and taking the mean square deviation as the first loss value.

5. The method for generating defective image as recited in claim 1, wherein a formula of the loss function of the GAN is $E_{t\sim P_{data}(t)}[\log D(t)] E_{z\sim p_z}(z) [\log (1-D (G(z|d)))]$, G is the generator, D is the discriminator, t is the defective sample training data set, $t\sim P_{data}(t)$ is a distribution of the defective sample training data set, D(t) represents that a first discrimination result that the discriminator discriminates whether samples in the defective sample training data set are true or false, E represents an output expectation, condition variable d is the first output images, $z\sim p_z(z)$ represents a priori Gaussian distribution of random Gaussian noise (Z), and D(G(z|d)) represents a second discrimination result that the discriminator discriminates whether an output of the generator under the condition variable d belongs to the defective sample training data set.

6. The method for generating defective image as recited in claim 1, wherein calculating the third loss value according to the first loss value and the second loss value comprises:

weighting and summing the first loss value and the second loss value according to a formula Loss=αLoss1+βLoss2 and obtaining the third loss value, wherein Loss is the third loss value, α is a weight of the first loss value, Loss1 is the first loss value, β is a weight of the second loss value, and Loss2 is the second loss value.

7. The method for generating defective image as recited in claim 1, wherein optimizing the generator and the discriminator of the GAN according to the third loss value and obtaining the optimized GAN, and taking the optimized GAN as the defective image adversarial network comprise:

adjusting parameters of the generator and the discriminator with the third loss value taken as the loss function; and stopping optimizing the generator and the discriminator when a discriminating accuracy output by the discriminator discriminating the generator reaches a preset condition.

8. An electronic device comprising:

a processor; and a non-transitory storage medium coupled to the processor and configured to store a plurality of instructions, which cause the processor to:

generate first input data according to flawless sample images and a first noise vector, and use an autoencoder as a generator of a Generative Adversarial Network (GAN);

input the first input data to the generator, select defect sample images as first output images of the generator, and generate defect training images according to the generator, the first input data and the first output images;

calculate a first loss value between the flawless sample images and the defective training images by using a preset error function;

input the defective training images into a discriminator of the GAN, and calculate a second loss value by a loss function of the GAN;

calculate a third loss value according to the first loss value and the second loss value, optimize the generator and the discriminator of the GAN according to the third loss value and obtain an optimized GAN, and take the optimized GAN as a defective image adversarial network; and obtain flawless testing images, input the flawless testing images and a second noise into the generator of the defective image adversarial network, and generate defective images by processing the flawless testing images and the second noise using the generator of the defective image adversarial network.

9. The electronic device as recited in claim 8, wherein the plurality of instructions are further configured to cause the processor to:

vectorize the flawless sample images and obtain a feature vector of the flawless sample images;

generate the first noise vector conforming to Gaussian random distribution by implementing a preset noise generation method; and splice the feature vector of the flawless sample images and the first noise vector, and obtain the first input data.

10. The electronic device as recited in claim 9, wherein the plurality of instructions are further configured to cause the processor to:

input the first input data into the generator;

calculate the first input data by using coding layers of the generator and obtain an implicit vector of the first input data;

select the defect sample images as the first output images; and reconstruct the first output images according to the implicit vector of the first input data by using decoding layers of the generator and obtaining the defect training images.

11. The electronic device as recited in claim 8, wherein the plurality of instructions are further configured to cause the processor to:

obtain a first pixel matrix of the flawless sample images;

obtain a second pixel matrix of the defective training images; and calculate a mean square deviation of the first pixel matrix and the second pixel matrix, and take the mean square deviation as the first loss value.

12. The electronic device as recited in claim 8, wherein a formula of the loss function of the GAN is $E_{t\sim P_{data}(t)}[\log D(t)]+E_{z\sim p_z(z)}[\log (1-D (G(z|d)))]$, G is the generator, D is the discriminator, t is the defective sample training data set, $t\sim P_{data}(t)$ is a distribution of the defective sample training data set, D(t) represents that a first discrimination result that the discriminator discriminates whether samples in the defective sample training data set are true or false, E represents an output expectation, condition variable d is the first output images, $z\sim p_z(z)$ represents a priori Gaussian distribution of random Gaussian noise (Z), and D(G(z|d)) represents a second discrimination result that the discriminator discriminates whether an output of the generator under the condition variable d belongs to the defective sample training data set.

13. The electronic device as recited in claim 8, wherein the plurality of instructions are further configured to cause the processor to:

weight and sum the first loss value and the second loss value according to a formula Loss=αLoss1+βLoss2 and obtain the third loss value, wherein Loss is the third loss value, α is a weight of the first loss value, Loss1 is the first loss value, β is a weight of the second loss value, and Loss2 is the second loss value.

14. The electronic device as recited in claim 8, wherein the plurality of instructions are further configured to cause the processor to:

adjust parameters of the generator and the discriminator with the third loss value taken as the loss function; and stop optimizing of the generator and the discriminator when a discriminating accuracy output by the discriminator discriminating the generator reaches a preset condition.

15. A non-transitory storage medium having stored thereon instructions that, when executed by at least one processor of an electronic device, causes the at least one processor to execute instructions of a method for generating defective image, the method comprising:

generating first input data according to flawless sample images and a first noise vector, and using an autoencoder as a generator of a Generative Adversarial Network (GAN);

inputting the first input data to the generator, selecting defect sample images as first output images of the generator, and generating defect training images according to the generator, the first input data and the first output images;

calculating a first loss value between the flawless sample images and the defective training images by using a preset error function;

inputting the defective training images into a discriminator of the GAN, and calculating a second loss value by a loss function of the GAN;

calculating a third loss value according to the first loss value and the second loss value, optimizing the generator and the discriminator of the GAN according to the third loss value and obtaining an optimized GAN, and taking the optimized GAN as a defective image adversarial network; and obtaining flawless testing images, inputting the flawless testing images and a second noise into the generator of the defective image adversarial network, and generating defective images by processing the flawless testing images and the second noise using the generator of the defective image adversarial network.

16. The non-transitory storage medium as recited in claim 15, wherein the method comprising:

vectorizing the flawless sample images and obtaining a feature vector of the flawless sample images;

generating the first noise vector conforming to Gaussian random distribution by implementing a preset noise generation method; and splicing the feature vector of the flawless sample images and the first noise vector, and obtaining the first input data.

17. The non-transitory storage medium as recited in claim 16, wherein the method comprising:

inputting the first input data into the generator;

calculating the first input data by using coding layers of the generator and obtaining an implicit vector of the first input data;

selecting the defect sample images as the first output images; and reconstructing the first output images according to the implicit vector of the first input data by using decoding layers of the generator and obtaining the defect training images.

18. The non-transitory storage medium as recited in claim 15, wherein the method comprising:

obtaining a first pixel matrix of the flawless sample images;

obtaining a second pixel matrix of the defective training images; and calculating a mean square deviation of the first pixel matrix and the second pixel matrix, and taking the mean square deviation as the first loss value.

19. The non-transitory storage medium as recited in claim 15, wherein a formula of the loss function of the GAN is $E_{t \sim P_{data}(t)}[\log D(t)] + E_{z \sim p_z(z)}[\log(1 - D(G(z|d)))]$, G is the generator, D is the discriminator, t is the defective sample training data set, $t \sim P_{data}(t)$ is a distribution of the defective sample training data set, D(t) represents that a first discrimination result that the discriminator discriminates whether samples in the defective sample training data set are true or false, E represents an output expectation, condition variable d is the first output images, $z \sim p_z(z)$ represents a priori Gaussian distribution of random Gaussian noise (Z), and D(G(z|d)) represents a second discrimination result that the discriminator discriminates whether an output of the generator under the condition variable d belongs to the defective sample training data set.

20. The non-transitory storage medium as recited in claim 15, wherein the method comprising:

weighting and summing the first loss value and the second loss value according to a formula Loss=$\alpha$Loss1+$\beta$Loss2 and obtaining the third loss value, wherein Loss is the third loss value, $\alpha$ is a weight of the first loss value, Loss1 is the first loss value, $\beta$ is a weight of the second loss value, and Loss2 is the second loss value.

\* \* \* \* \*